UNITED STATES PATENT OFFICE.

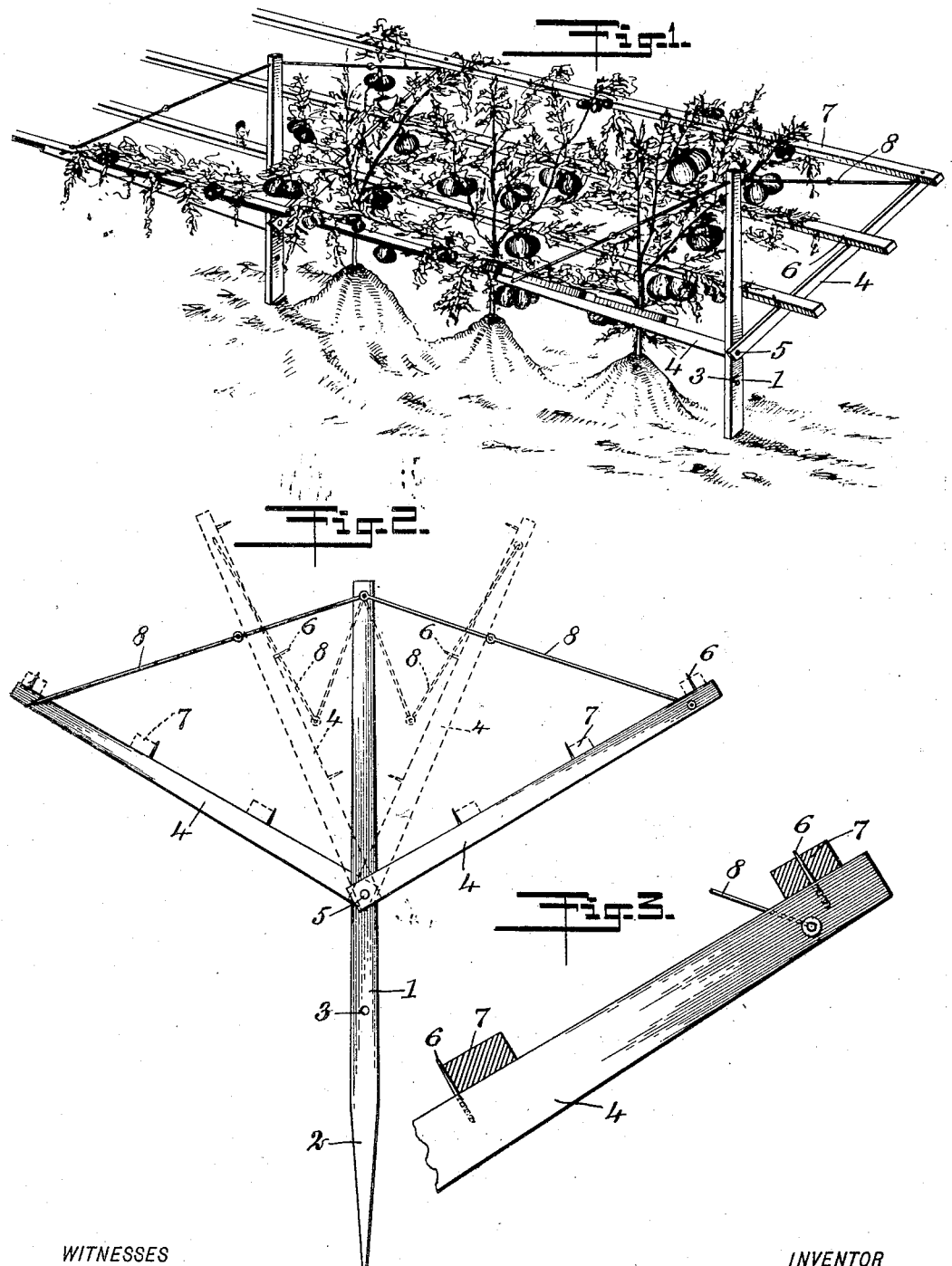

LLEWELLYN BARLOW STETSON, OF BELLEVUE, WASHINGTON.

FRAME.

941,894.  Specification of Letters Patent.  Patented Nov. 30, 1909.

Application filed February 20, 1909. Serial No. 479,234.

*To all whom it may concern:*

Be it known that I, LLEWELLYN B. STETSON, a citizen of the United States, and a resident of Bellevue, in the county of King and State of Washington, have invented a new and Improved Frame, of which the following is a full, clear, and exact description.

This invention relates to frames, and more particularly to adjustable frames, such as are adapted to be used in the cultivation of plants, such as tomato vines or the like, and which consist of uprights adapted to be driven into the ground, and having arms pivotally secured thereto, means for holding the arms extended, and supports removably arranged on the arms of the uprights.

The object of the invention is to provide a device of the class described, simple in construction and inexpensive to manufacture, which will support the branches of a plant, thus obviating the danger of their becoming broken through the weight of the fruit which they carry.

Reference is to be had to the accompanying drawings forming a part of this specification, in which similar characters of reference indicate corresponding parts in all the views.

Figure 1 is a perspective view showing an embodiment of my invention being used to support the branches of a tomato vine; Fig. 2 is an enlarged side elevation of one of the uprights, showing, in dotted outline, the arms in a partially folded position; and Fig. 3 is an enlarged side elevation of the end of one of the arms.

Before proceeding to a more detailed description of my invention, it should be understood that in the cultivation of such plants as tomato vines or the like, when the fruit begins to grow in size, the weight of it tends to cause the branches of the vine to break off near the stalk. Several methods have been employed to overcome this difficulty, such as tying the vine by means of string to uprights, or by using wire supports. The former method requires a great deal of time and labor, while in the second, the wires are apt to injure the branches of the vine.

My device consists of a wooden frame which, when not in use, can easily be folded and stored away.

In general, this device consists of uprights having adjustable arms pivotally secured thereto, means for holding the arms extended, and removable supports connecting the arms of adjacent uprights.

In the cultivation of tomato vines, the branches of the latter rest upon the supports and thus, when the tomatoes become large, their weight will not cause the branches to break away from the stalks.

In the specific form shown in the drawings, 1 represents an upright, having its lower end 2 suitably tapered so that it may be easily driven into the ground. Located on the upright 1 are a plurality of openings 3 at any one of which arms 4 can be removably secured by means of a pivot pin 5, which extends through the opening. The arms 4 are provided with a plurality of studs 6, which serve to carry supports 7, the latter connecting the arms of adjacent supports, as shown most clearly in Fig. 1. If desired, the support which is at the extremity of each arm may be firmly secured in place. Links 8 extend from the top of the upright to the ends of the arms, and are pivotally connected thereto. Each link is composed of two members pivotally secured to one another, so that the arms may be easily folded on the upright, as shown in dotted outline in Fig. 2. The openings 3 in the uprights allow the arms to be adjusted at any desired distance from the ground.

Having thus described my invention, I claim as new and desire to secure by Letters Patent:—

1. A device of the class described, comprising a plurality of uprights adapted to be driven into the ground, each upright having arms pivotally and adjustably secured thereto, means for holding said arms extended, and further means for supporting the branches of a vine.

2. A device of the class described, comprising uprights, arms pivotally and adjustably secured to said uprights, flexible means for holding said arms extended, each arm having a plurality of studs arranged thereon, and supports connecting the arms of adjacent uprights, said supports being held in place by means of said studs.

3. A device of the class described, comprising an upright having a longitudinal series of openings, a plurality of arms, each provided with an opening adapted to register with the opening of the other arm and with one of the openings of the series, a pin for traversing the registering openings, and a jointed link connecting the free end of each arm with the top of the standard.

4. A device of the class described, comprising an upright having a longitudinal series of openings, a plurality of arms, each provided with an opening adapted to register with the opening of the other arm and with one of the openings of the series, a pin for traversing the registering openings, and a jointed link connecting the free end of each arm with the top of the standard, said arms being provided at spaced intervals on their upper edges with studs for the purpose set forth.

In testimony whereof I have signed my name to this specification in the presence of two subscribing witnesses.

LLEWELLYN BARLOW STETSON.

Witnesses:
GEORGE H. STETSON,
GERTRUDE A. IVEY.